United States Patent
Briskey et al.

(10) Patent No.: US 6,487,678 B1
(45) Date of Patent: Nov. 26, 2002

(54) RECOVERY PROCEDURE FOR A DYNAMICALLY RECONFIGURED QUORUM GROUP OF PROCESSORS IN A DISTRIBUTED COMPUTING SYSTEM

(75) Inventors: Kenneth C. Briskey, Hyde Park, NY (US); Marcos N. Novaes, Hopewell Junction, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/387,185

(22) Filed: Aug. 31, 1999

(51) Int. Cl.[7] .................................................. G06F 11/00
(52) U.S. Cl. ............................. 714/4; 714/12; 714/23; 712/15
(58) Field of Search .......................... 714/6, 12, 23, 714/10, 820, 4; 710/39, 200; 707/10, 203, 28; 712/30, 15, 10

(56) References Cited

U.S. PATENT DOCUMENTS

| | | | |
|---|---|---|---|
| 5,261,085 A | 11/1993 | Lamport | 395/575 |
| 5,339,404 A | 8/1994 | Vandling, III | 395/575 |
| 5,475,819 A | 12/1995 | Miller et al. | 395/200.03 |
| 5,604,862 A | 2/1997 | Midgely et al. | 395/182.04 |
| 5,606,693 A | 2/1997 | Nilsen et al. | 395/610 |
| 5,608,865 A | 3/1997 | Midgely et al. | 395/180 |
| 5,659,682 A | 8/1997 | Devarakonda et al. | 395/184.01 |
| 5,675,723 A | 10/1997 | Ekrot et al. | 395/182.08 |
| 5,682,470 A | 10/1997 | Dwork et al. | 395/182.1 |
| 5,696,895 A | 12/1997 | Hemphill et al. | 395/182.02 |
| 5,710,921 A | 1/1998 | Hirose | 395/676 |
| 5,787,250 A * | 7/1998 | Badovinatz et al. | 395/200.31 |
| 5,793,962 A * | 8/1998 | Badovinatz et al. | 395/200.31 |
| 6,108,699 A * | 8/2000 | Moiin | 709/221 |
| 6,163,855 A * | 12/2000 | Shrivstava et al. | 714/4 |
| 6,202,067 B1 * | 3/2001 | Blood et al. | 707/10 |
| 6,243,744 B1 * | 6/2001 | Snaman, Jr. et al. | 709/220 |

* cited by examiner

Primary Examiner—Robert Beausoleil
Assistant Examiner—Marc Duncan
(74) Attorney, Agent, or Firm—Floyd A. Gonzalez, Esq.; Lawrence D. Cutter; Heslin Rothenberg Farley & Mesiti P.C.

(57) ABSTRACT

Dynamic reconfiguration of a quorum group of processors and recovery procedure therefore are provided for a shared nothing distributed computing system. Dynamic reconfiguration proceeds notwithstanding unavailability of at least one processor of the quorum group of processors assuming that a quorum of the remaining processors exists. Recovery processing is implementing by the group of processors so that the at least one processor which was unavailable during the dynamic reconfiguration of the group is able to obtain current state information once becoming active. Each processor of the group of processors includes an incarnation number and a list of member processors which resulted from a commit process resulting in its incarnation number. The recovery processing includes exchanging the processors' incarnation numbers and lists of processors for propagation of the current state of the quorum group of processors to the at least one processor now becoming available.

16 Claims, 10 Drawing Sheets

RECOVERY PROCEDURE FOR A DYNAMICALLY RECONFIGURED QUORUM GROUP OF PROCESSORS IN A DISTRIBUTED COMPUTING SYSTEM

CROSS-REFERENCE TO RELATED APPLICATION

This application contains subject matter which is related to the subject matter of the following applications, which are assigned to the same assignee as this application and filed on the same day as this application. The below-listed applications are hereby incorporated herein by reference in their entirety:

"DYNAMIC RECONFIGURATION OF A QUORUM GROUP OF PROCESSORS IN A DISTRIBUTED COMPUTING SYSTEM" by Briskey et al., Ser. No. 09/387,666, "RELAXED QUORUM DETERMINATION FOR A QUORUM BASED OPERATION" by Briskey et al., Ser. No. 09/386,549, "RELAXED QUORUM DETERMINATION FOR A QUORUM BASED OPERATION OF A DISTRIBUTED COMPUTING SYSTEM" by Briskey et al., Ser. No. 09/387,188,

TECHNICAL FIELD

This invention relates to distributed computing systems, and more particularly, to the dynamic reconfiguration of a quorum group of processors within a distributed computing system, and to a recovery procedure for one or more processors of the group which were unavailable during the dynamic reconfiguration.

BACKGROUND OF THE INVENTION

Distributed computing systems employ a plurality of processing elements. These processing elements might be individual processors linked together in a network or a plurality of software instances operating concurrently in a coordinated environment. In the former case, the processors communicate with each other through a network which supports a network protocol. The protocol might be implemented by using a combination of hardware and software components. Processing elements typically communicate with each other by sending and receiving messages or packets through a common interface. One type of distributed computing system is a shared nothing distributed system wherein the processing elements do not share storage. Within such a system, the elements must exchange messages in order to agree on the state of the distributed system.

Thus, within a shared nothing distributed processing system, message exchange protocol is needed. For example, the message exchange protocol will seek to solve the problem of the current state of a database in the distributed processing system. Specifically, the protocol needs to define which processing element has the latest version of the database, since processing elements can create different database versions. As is well known, a high availability system allows one or more processing elements to become unavailable while the system continues to perform processing. Therefore, the database can be modified within a high availability distributed processing system while one or more processing elements are unavailable (e.g., off line). When a previously unavailable processing element becomes available, an updated version of the database must be provided to that processing element.

Conventional shared nothing distributed processing systems have the restriction that a group of processing elements participating in a quorum driven recovery must be static. That is, once a server group is defined members cannot be added or removed dynamically, i.e., while the database is running and one or more members are potentially unavailable. The only way to make a reconfiguration change in a conventional shared nothing distributed processing system is to use a redefine operation which requires a change to a configuration file in all servers of the system, and therefore requires that all servers be currently available for the reconfiguration change.

DISCLOSURE OF THE INVENTION

Notwithstanding the above, in the case of highly available distributed processing systems, such as database servers, it is deemed desirable to allow the addition or deletion of servers without requiring that all servers of a group of servers be available. The distributed server recovery procedure (DSRP) provided herein allows for this modification of the configuration of the server group requiring only that a majority (quorum) of the currently defined servers be available for the modification to proceed. For example, some servers may be unconfigured (excluded from the group) while they are down, and other servers may be added. The process of adding or deleting servers while one or more servers may be unavailable is referred to herein as "dynamically reconfiguring" the quorum group of processors. Again, the traditional procedures for recovery of distributed servers require a static configuration environment.

To summarize, provided herein is a method for recovering a current state of a quorum group of processors dynamically reconfigured while at least one processor of the quorum group of processors was unavailable. The method includes: obtaining the current state for the dynamically reconfigured quorum group of processors from one or more processors of the quorum group of processors; and wherein each processor of the quorum group of processors includes an incarnation number and a member list of processors which participated in a commit process resulting in its incarnation number, and wherein the obtaining comprises checking the one or more processors of the quorum group of processors for incarnation numbers and member lists of processors which participated in commit processes resulting in the incarnation numbers.

System and computer program products corresponding to the above-summarized methods are also described and claimed herein.

To restate, provided herein is a reconfiguration capability for dynamically reconfiguring a quorum group of processors notwithstanding that one or more processors of the group may be unavailable, as well as a recovery procedure for implementation by the processors of the group when the one or more previously unavailable processors become available. By being able to dynamically reconfigure a group of processors while one or more of the processors are unavailable, a system administrator can ensure that critical systems are maintained even if one or more processors become unavailable, provided that a quorum of processors remains. The dynamical reconfiguration capabilities and recovery procedures described herein thus provide greater flexibility in a high availability, distributed computing environment. A relaxed quorum calculation is also presented for use with a quorum based operation, such as the recovery procedure described herein.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
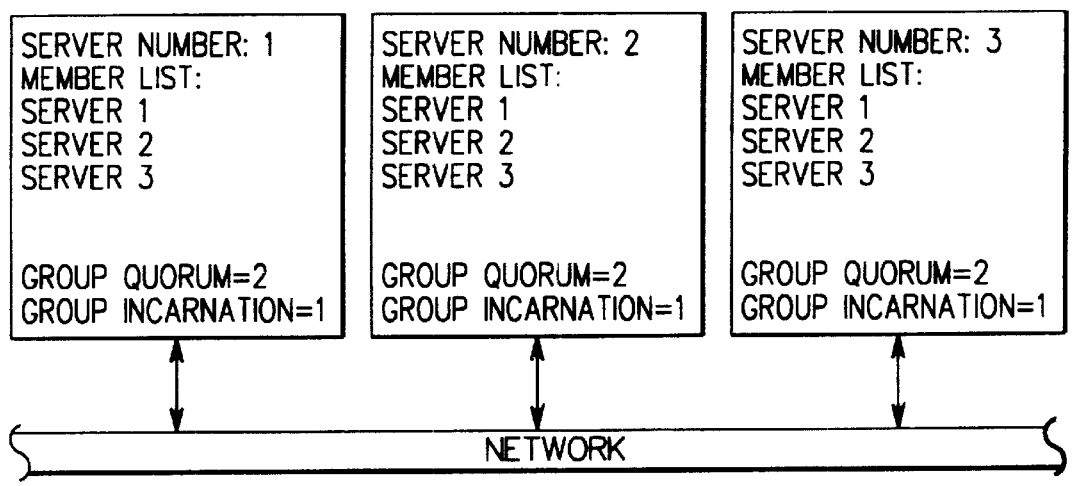
FIG. 1 depicts a three server distributed processing system in a first state (herein incarnation 1) showing that group quorum is 2 for this three server system.

The problems solved by the present invention are that of dynamic reconfiguration and recovery of a distributed, highly available processing system, such as a database server. The high availability characteristic of such a system allows it to function even when some peers of the server group are not available. Although described herein in one embodiment in connection with database servers, those skilled in the art will understand that the concepts presented are applicable to any group of processors of a distributed processing system having multiple processing elements. In the context of this invention, processor means a processing element including an individual processor or a processing instance implemented in software. The database servers discussed herein are provided as one example only of a group of processors.

Because of the assumed high availability characteristic of the system, certain processors may miss updates to a distributed database, and will need to undergo a recovery procedure when they become available again. Typically, the recovery procedure involves a check of the version number of the database, also called the "incarnation number". Recovery is complicated by the fact that, in accordance with this invention, the configuration of the server subsystem may itself have changed, i.e., the system may have undergone "dynamic reconfiguration". The distributed server recovery procedure (DSRP) presented herein solves the recovery problem in such a case, thus allowing for this dynamic reconfiguration to proceed.

The term "configuration" in this disclosure refers specifically to the list of members of the distributed system. A typical distributed system is configured by selecting processors from a pool of available processors that reside in a network, and grouping them together. Typically, the number of processors in the network is much larger than the number in any given distributed system. One example is a university campus with several computers (processors) that are interconnected in the same network. It is often desirable to group a subset of processors which reside in the network into a "distributed system". A distributed system is defined as a set of machines which cooperate in a variety of ways, and are able to distribute tasks among them. For example, if there are 100 processors in a network, we can configure any number of distributed systems by combining them together. We can (for example) build 10 systems of 10 processors each, or 20 of 5 processors each, or any other combination thereof. An important aspect of this "configuration" is the list of which processors are part of a specific group. This list defines the set of members that participate in the same group, and this determination is necessary in order to correctly accept or reject requests from other members of the group. The members of the group have to, at any given time, agree that this list is consistent; that is, that every node (processor) in the distributed system has the exact same copy of this list.

The specific technology presented in this disclosure is a way in which the member of a group of processors can verify if the list which it has is accurate, or if it needs to obtain a more updated list from another member of the group. This invention achieves this objective by attaching a specific "incarnation number" for each list that is generated. This incarnation number is maintained by ensuring that any changes to the list of members of the processor group be made to at least a "quorum" of members of the current group. The changes in the list happen when a user of the distributed system changes the configuration by adding and deleting processors from the group. When the list is altered by additions or deletions of member processors, the incarnation number is incremented.

Figure 9:
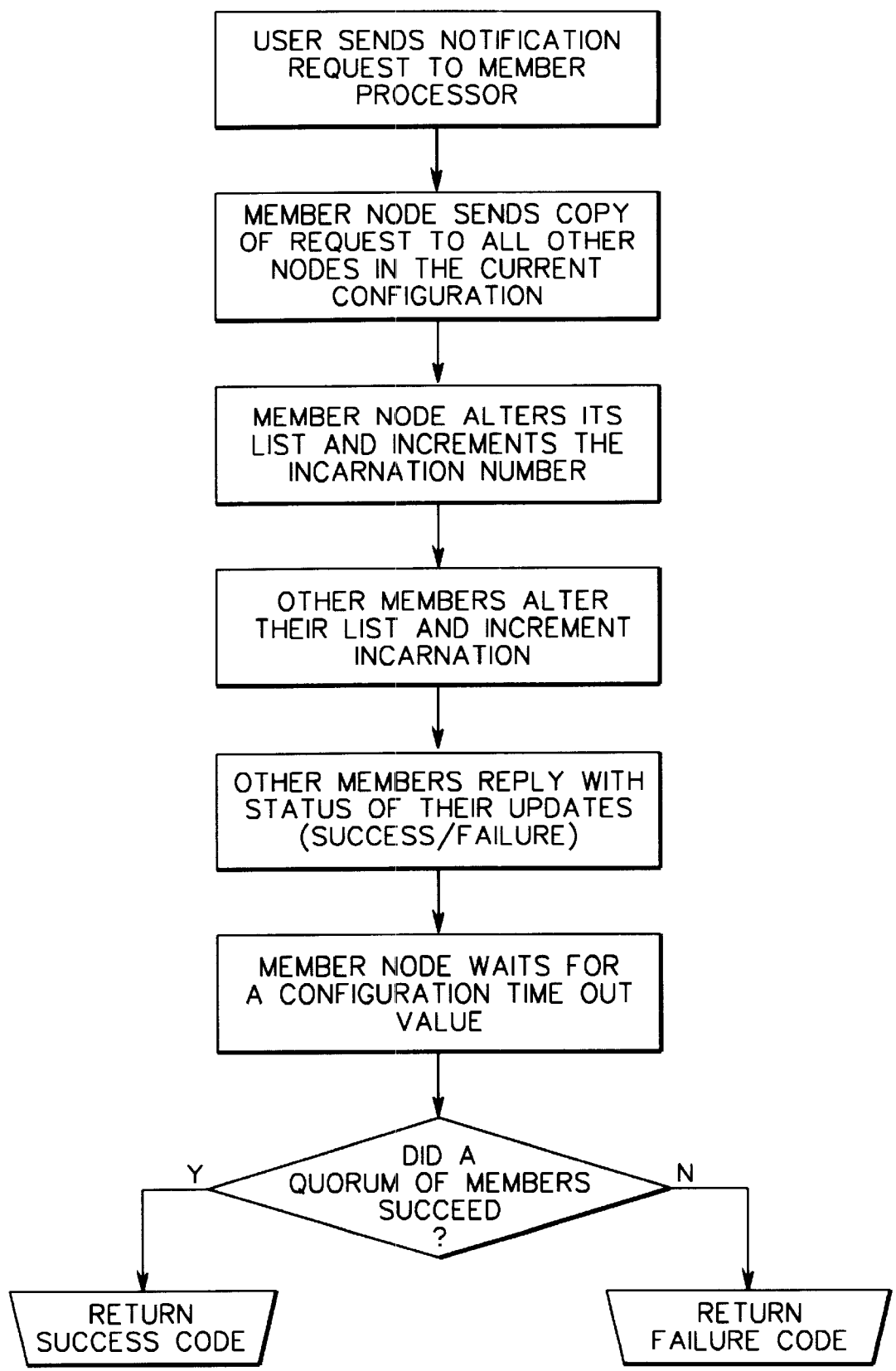
FIG. 9 is a flowchart of one embodiment of a procedure for changing configuration of a group of processors in accordance with the principles of the present invention.

When the user of the distributed system requests a change in configuration, it can be done as follows. The member of the group that received the request sends a copy of the request to all other members, and does the configuration change itself. The operation change encompasses doing the change in the list and updating the incarnation number. It will then wait for replies of the other members of the group. If a quorum of members reply with a success message, the member that received the original request returns an affirmative code to the user that requested the configuration change. Otherwise, an error is returned (see FIG. 9). If an error is returned, the user of the distributed system will have to redefine the system (as described above), and thus the dynamic recovery is not possible. But if the return code is success, the reconfiguration is guaranteed to have been successful, and the list is guaranteed to be consistent in a quorum of nodes.

Typical distributed systems require that any change in configuration be made to all nodes in the system. This invention relaxes the requirement for configuration changes by requiring that the change be made to only a quorum of nodes. This makes it possible to alter the configuration of a distributed system even if a member node is not available for a reconfiguration operation.

In a recovery scenario, the processing elements will exchange incarnation numbers in order to locate the latest state of the system, for example, the latest version of the database. Since changes to the systems data (and incrementing of the incarnation number) are only allowed when there is a quorum (majority) of the registry processors available; the traditional quorum algorithm (i.e., for a static group configuration) is a simple one. Traditionally it suffices that a majority of the servers be available and that the server with the highest incarnation number is guaranteed to have the most recently updated version of a database. This algorithm, however, has the restriction that the group participating in a quorum driven recovery must be static. That is, once the server group is defined, members cannot be added or removed dynamically. Again, dynamically is defined herein to mean that the database is running and there are one or more members of the group which are potentially unavailable. The only way to make the reconfiguration change conventionally is to use the redefine operation, which requires a change to the configuration file of all servers and therefore requires that all servers be available for the reconfiguration change.

In the case of high availability computing systems, applicants deem it desirable to allow for the addition and deletion of processors to the group without requiring that all members be available. FIGS. 1–5 depict various states of a distributed processing system, generally denoted 10, useful in explaining the difficulty of dealing with changes to the quorum group where one or more members of the group may be unavailable. In FIG. 1, the distributed processing system 10 includes three servers. This figure is assumed to represent an initial configuration for a server group. The group has just been configured, such that group incarnation is 1 and there are three servers in the group, which are named server1, server2 and server3. Since there are three members to the group, group quorum is 2, i.e., a majority of 3 is 2.

Figure 2:
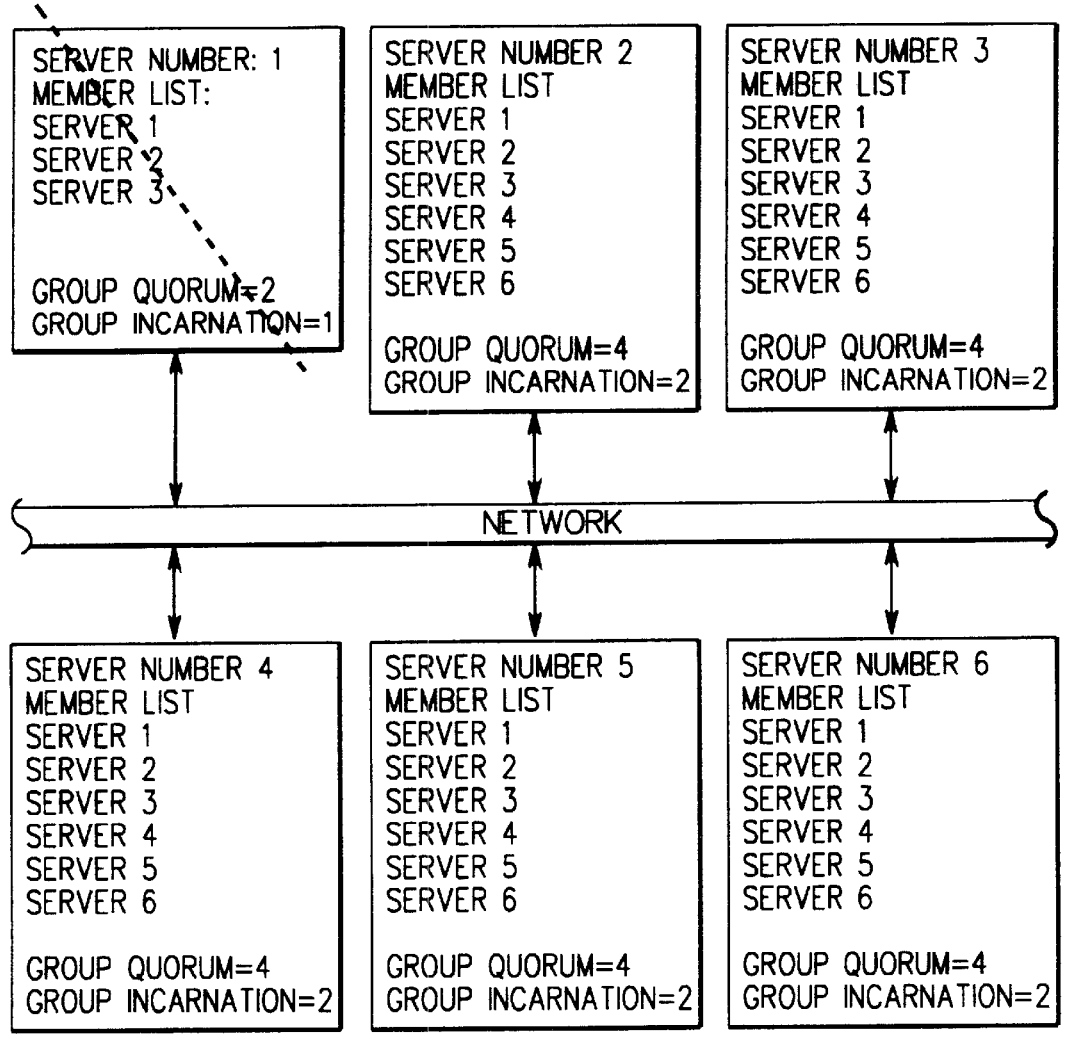
FIG. 2 depicts the distributed processing system of FIG. 1 with a new group incarnation 2 comprising server2 and server3 and new server4, server5 & server6, with server1 being unavailable.
Figure 3:
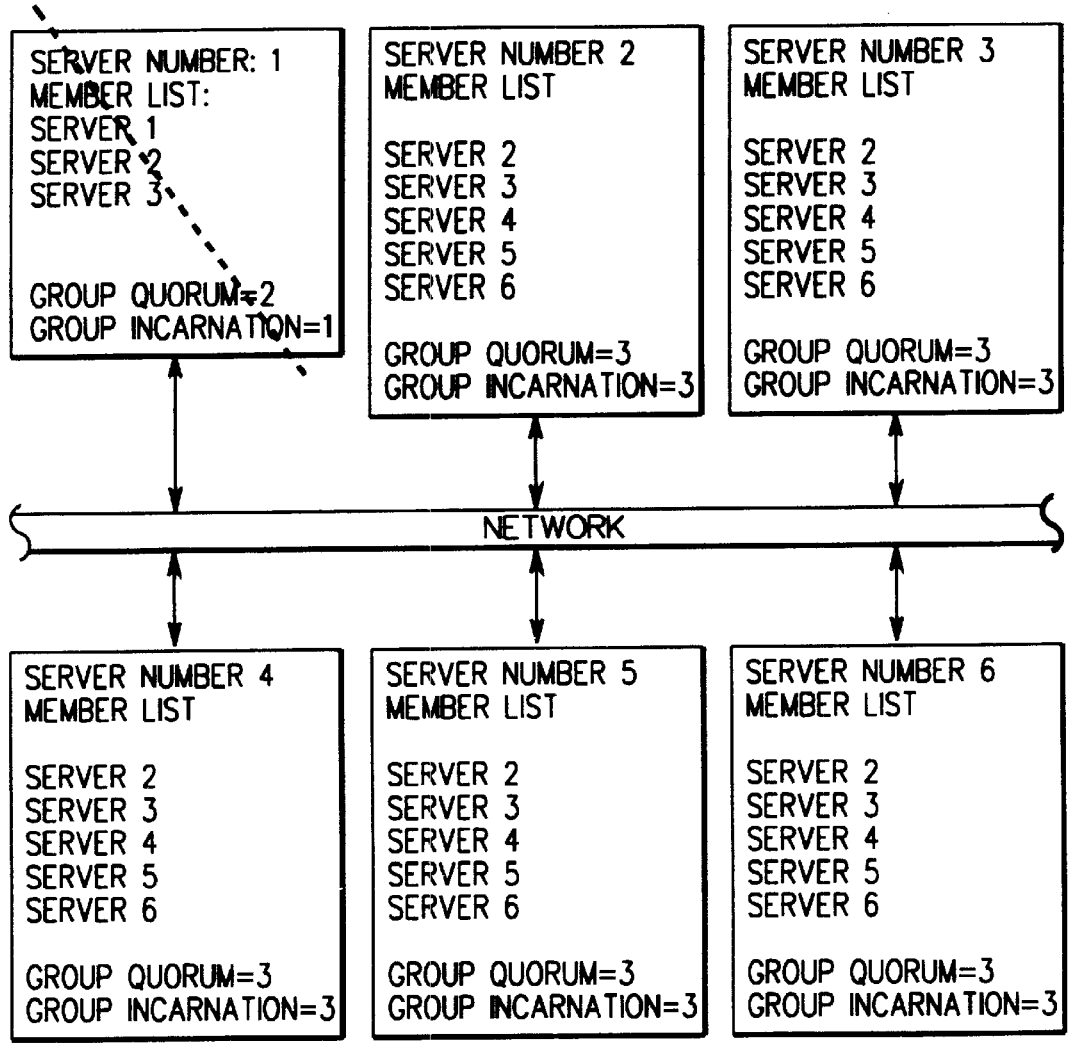
FIG. 3 depicts the distributed processing system of FIG. 2, with a new group incarnation 3, wherein server1 has been undefined for purposes of quorum calculation, whereby the new group quorum is 3.

To illustrate the problem solved by the DSRP of the present invention, assume server1 becomes unavailable, for example, is powered down. The remaining two servers remain up and thus the group still has quorum to allow for changes. Further, assume that the administrator notices that server1 went down and desires to define new servers to guard against a future failure. Assume that the administrator now defines three more servers, numbered server4, server5 & server6. Since server1 is powered off at the time, its internal state is not changed. The new state of the distributed system is depicted in FIG. 2. In this new state, labeled group incarnation 2, group quorum is 4 since the member list of each active server, i.e., server2, server3, server4, server5 & server6 includes server1, meaning that the majority of 6 servers is 4.

Figure 4:
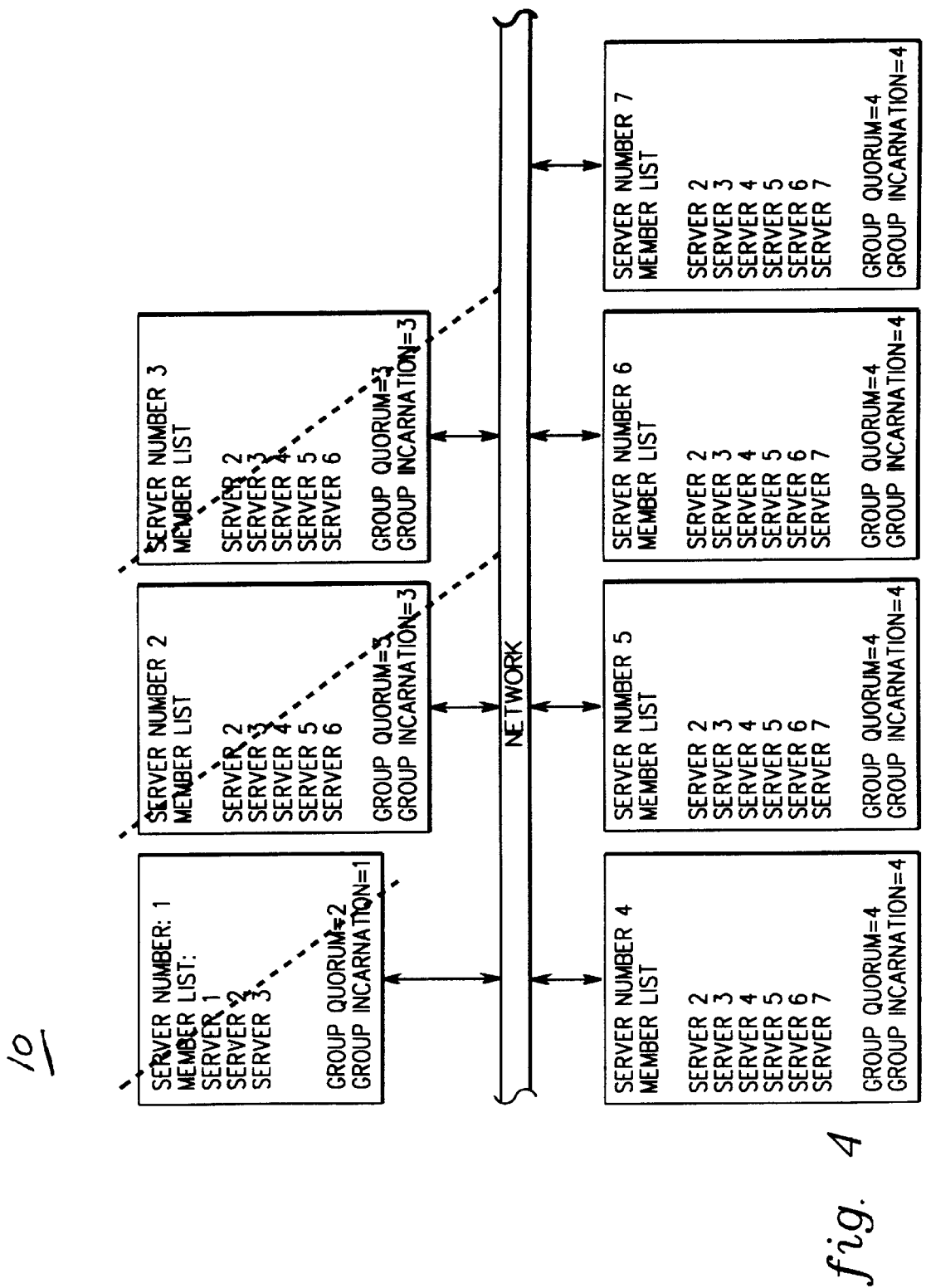
FIG. 4 depicts the distributed processing system of FIG. 3, with a new group incarnation 4 wherein server2 and server3 have become unavailable, and new server7 has been added to the system.
Figure 5:
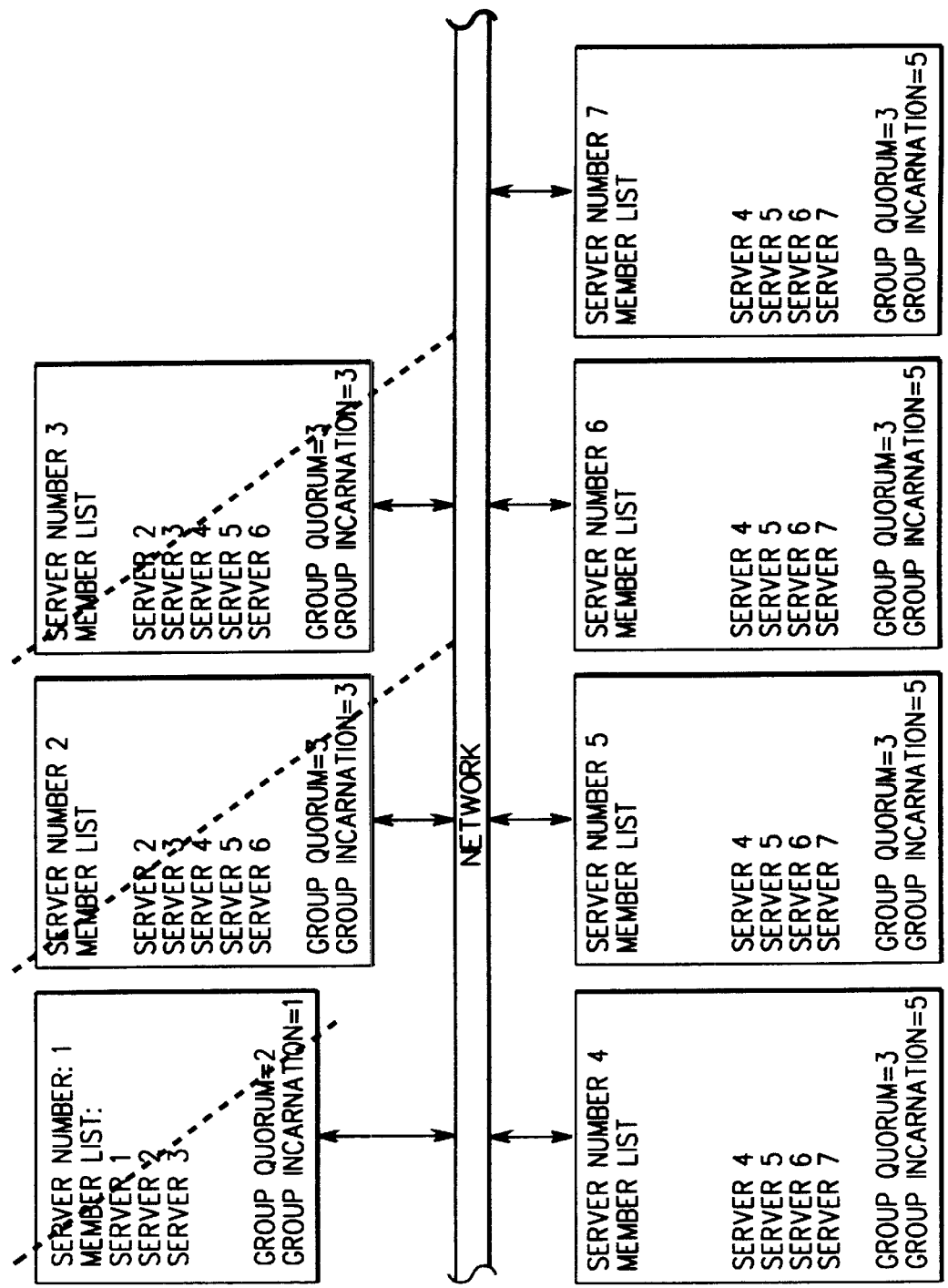
FIG. 5 depicts the distributed processing system of FIG. 4 with a new group incarnation 5 wherein group quorum has been revised to 3 with server2 and server3 having been undefined.

Assume now that the system administrator decides to undefine server1. The undefine operation is also a membership change and so the group incarnation is incremented to 3, resulting in the state depicted in FIG. 3. By undefining server1 the quorum for the group becomes 3 (the majority of 5), and this enables the system to withstand two failures and still maintain quorum. FIGS. 4 & 5 are presented to demonstrate how DSRP can cope with any configuration change even when server members are down. In FIG. 4, it is assumed that server2 and server3 have become unavailable and a new server7 is defined. The resulting state is shown in FIG. 4.

As shown in FIG. 4, the group quorum is now 4 (majority of 6). There are precisely four members in the group running at this time, so the group still has quorum. Next, assume that the administrator undefines members server2 and server3 reducing the total number of servers to 4, in which case the group quorum will then be 3. The system will again be able to sustain one failure in a member. The resulting state (group incarnation 5) is shown in FIG. 5. This final state of the example is the starting point for the tracing of the DSRP algorithm described herein below.

Since the "dynamic" configuration changes made to arrive at the state of FIG. 5 occurred while some servers were down, the state of the system is inconsistent. Assume that the servers that were down are now powered back on. It is clear from FIG. 5 that server1 has the most outdated state. Note that the group membership of server1 does not even contain any of the present numbers of the group. The objective of DSRP presented herein is to provide a search procedure that allows server1 to discover who the members of the present group are, so it can read (or receive) the latest configuration from one of them. The search must be done until the termination condition evaluates to TRUE or a stop search message is received from an active member of the current group. The termination condition states that the search is complete when the server doing the search discovers a quorum of members which agree to the same incarnation number. As presented with respect to FIG. 8, the search termination condition can be relaxed (quorum minus 1) in certain cases.

A major challenge to be solved by a recovery procedure which allows for dynamic reconfiguration is that of outdated servers. A server could potentially have been down for such a long period of time that it will no longer contain an accurate list of the members of the server group. It could be the case that several members are no longer defined as such; and it could very well be that even the server in question has been undefined by the other surviving members after it became unavailable. The Distributed Server Recovery Procedure presented herein is a distributed communications protocol which allows such an outdated server to gain access to the most recent copy of the database and update itself.

The DSRP algorithm is based on persistent storage of the state of the server group. This state consists of the incarnation number and the list of members which "voted for" this incarnation number; i.e., participated in the commit process which increments it. The DSRP algorithm is explained below with a concrete example. In the illustration of FIG. 5, a snapshot of the state of the server group prior to recovery is shown. The state is not consistent in all members because some of them (with lower incarnation numbers) have lost updates.

We can now trace the steps taken by the DSRP algorithm to retrieve the latest copy of the database. Note that, although in the scenario above server1 is no longer a database server, it may host other critical applications which need to access the data. The steps traced here follow the embodiment of the DSRP algorithm of the present invention depicted in FIGS. 6–8 starting from server1. But it must be kept in mind that in the case of total failure (e.g., if the cluster was rebooted in the scenario above), the DSRP algorithm would run in all nodes whose current state indicates that it is a server (although this information could be out of date).

The steps, from server1, are as follows: 1) server1 reads its persistent state. It will then attempt to contact the peer servers in its current server member list; and retrieve their incarnation numbers. It will notice that server2 has a higher incarnation number (3) and so knows that its server member list is out of date. It will then retrieve the server list from server2, and use it for the new search. 2) Using the list retrieved in the previous step, server1 performs the same protocol with the members in the new list. It starts by contacting server3. It notices that servers has the same incarnation number as server2 (3). It now knows of two servers with the same incarnation (servers 2 and 3 are both at incarnation 3). But since the quorum associated with incarnation 3 is 3, it needs to find one more server at this level to conclude its search. 3) sever1 now contacts server4, and retrieves its state. It now notices the bad news; i.e., server4 is at a higher incarnation number (5), and so it knows that server2 and server3 are also out of date. It continues to search using the retrieved state from server4. 4) server1 now contacts the next unvisited server in the newly retrieved member list, which is server5. It notices that server5 is also at incarnation 5. Now it knows that two servers are at incarnation 5, but the quorum associated with incarnation 5 is 3 (majority of 4) and so it needs one more confirmation.

In one embodiment, the DSRP algorithm presented herein allows for a relaxation of the quorum requirement in certain cases. In this case, for instance, it knows 2 servers (server4 and server5) which have the same incarnation, and which are part of the group of 4. This knowledge is enough to conclude the search since the two remaining members (server6 and server7) could not have a higher incarnation number because a strict quorum (majority of 4, i.e. 3) is required for changes in the database. Therefore, it would have been impossible for servers and server7 to make a configuration change without the participation of at least one of the other servers in the group (either server4 or servers). Since the state of server4 and server5 is known, it is safe for sever1 to assume that the latest incarnation of the database is 5 and conclude its search. The client applications in server1 can now access the most recently updated copy of the database from either server4 or server5.

Figure 6:
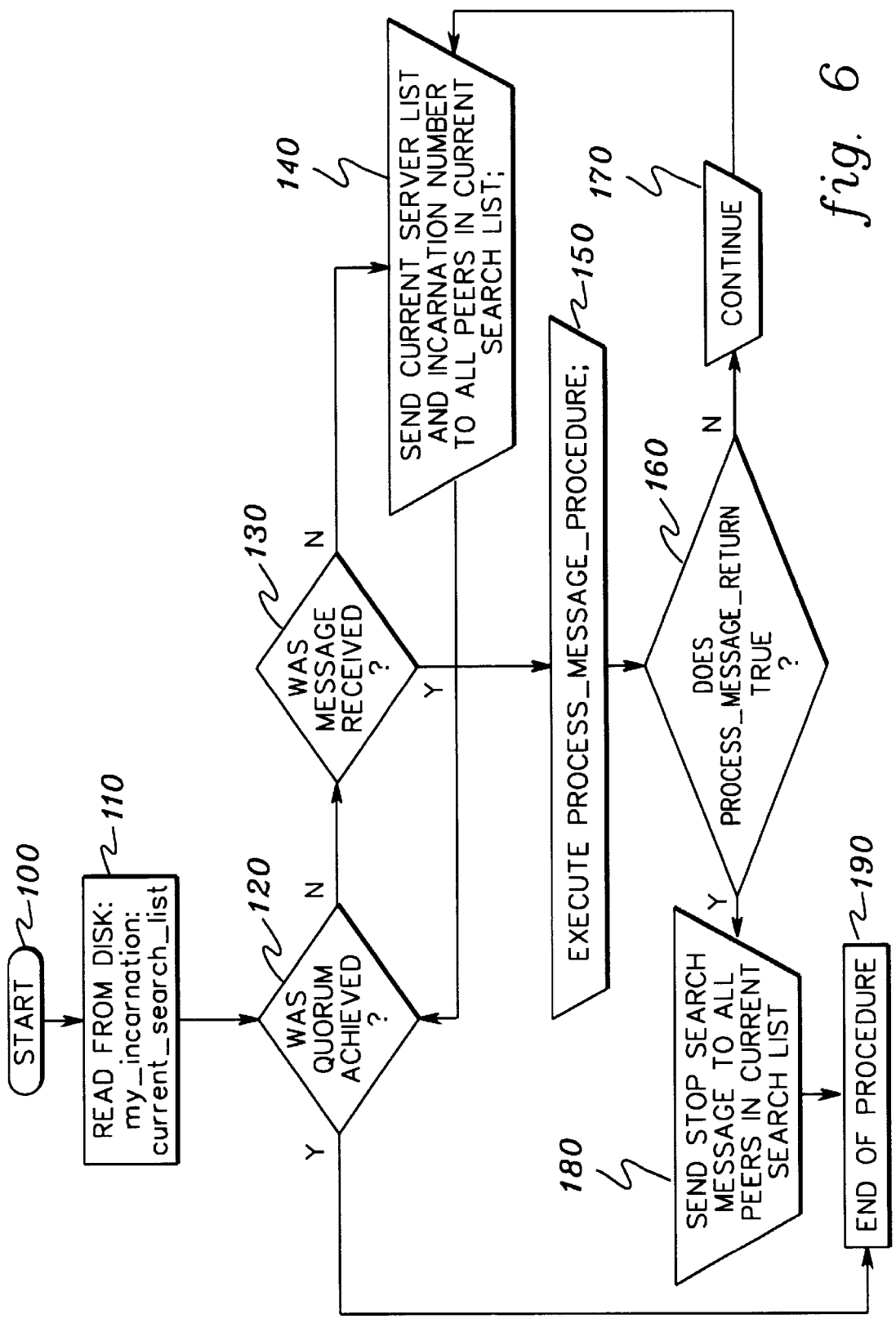
FIG. 6 is a flowchart of one embodiment of a dynamic server recovery procedure in accordance with the principles of the present invention.
Figure 7A:
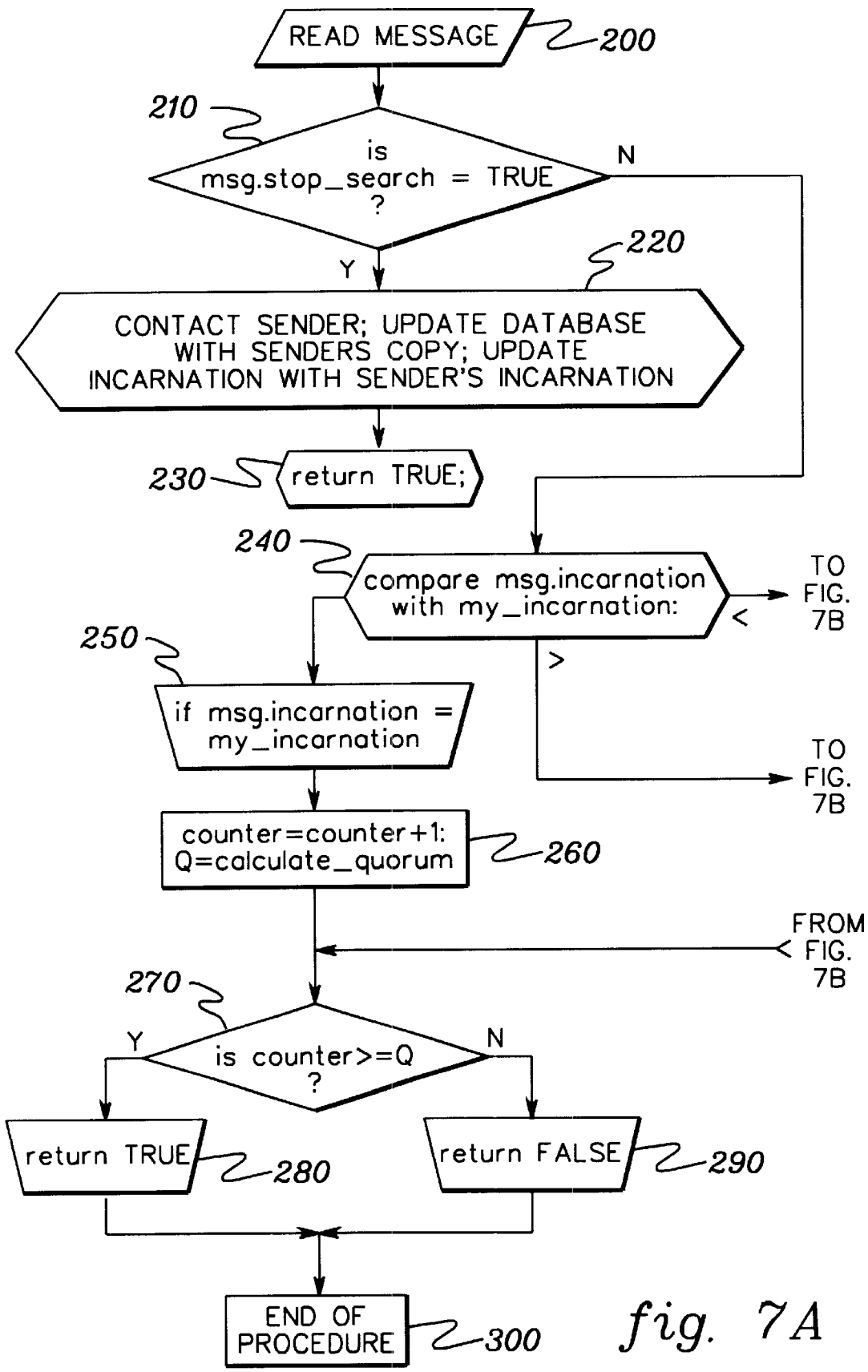
FIGS. 7A & 7B are a flowchart of one embodiment of a process_message_procedure in accordance with the principles of the present invention.
Figure 7B:
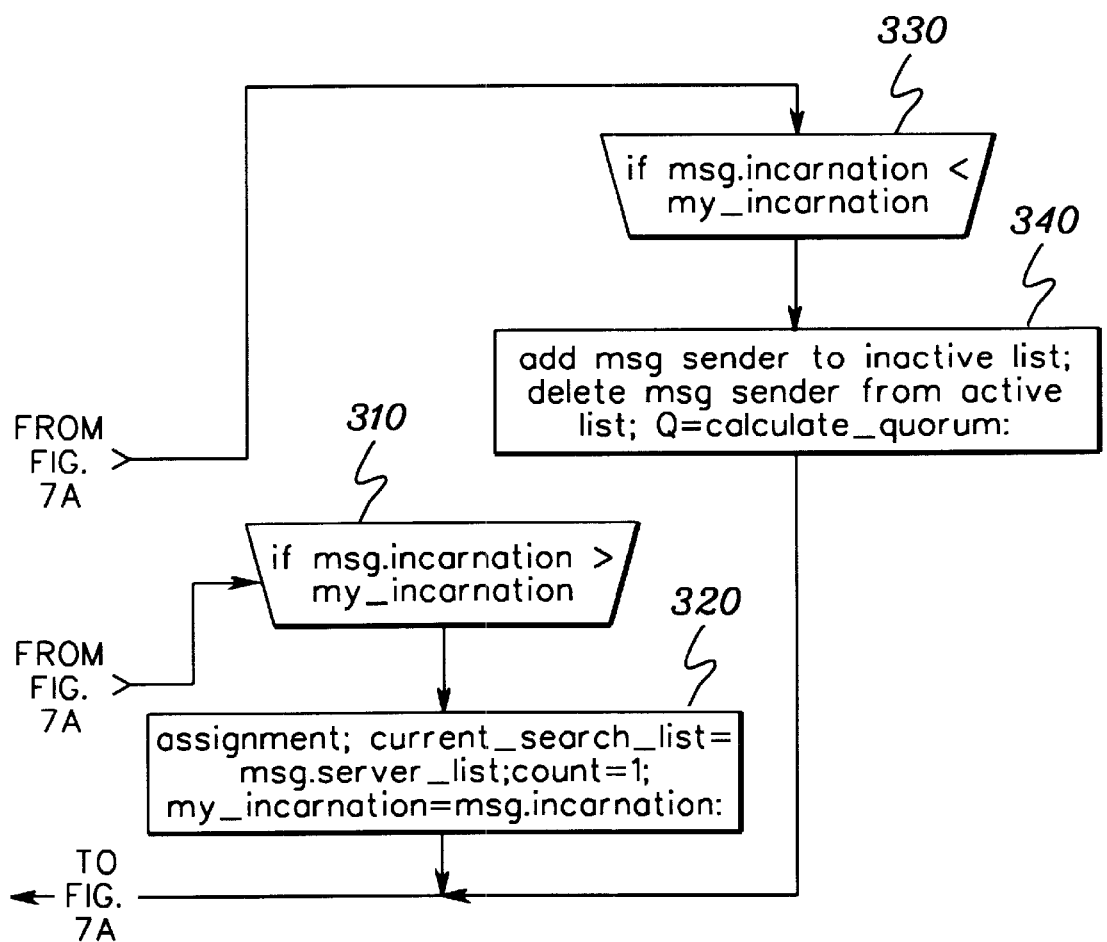
Figure 8:
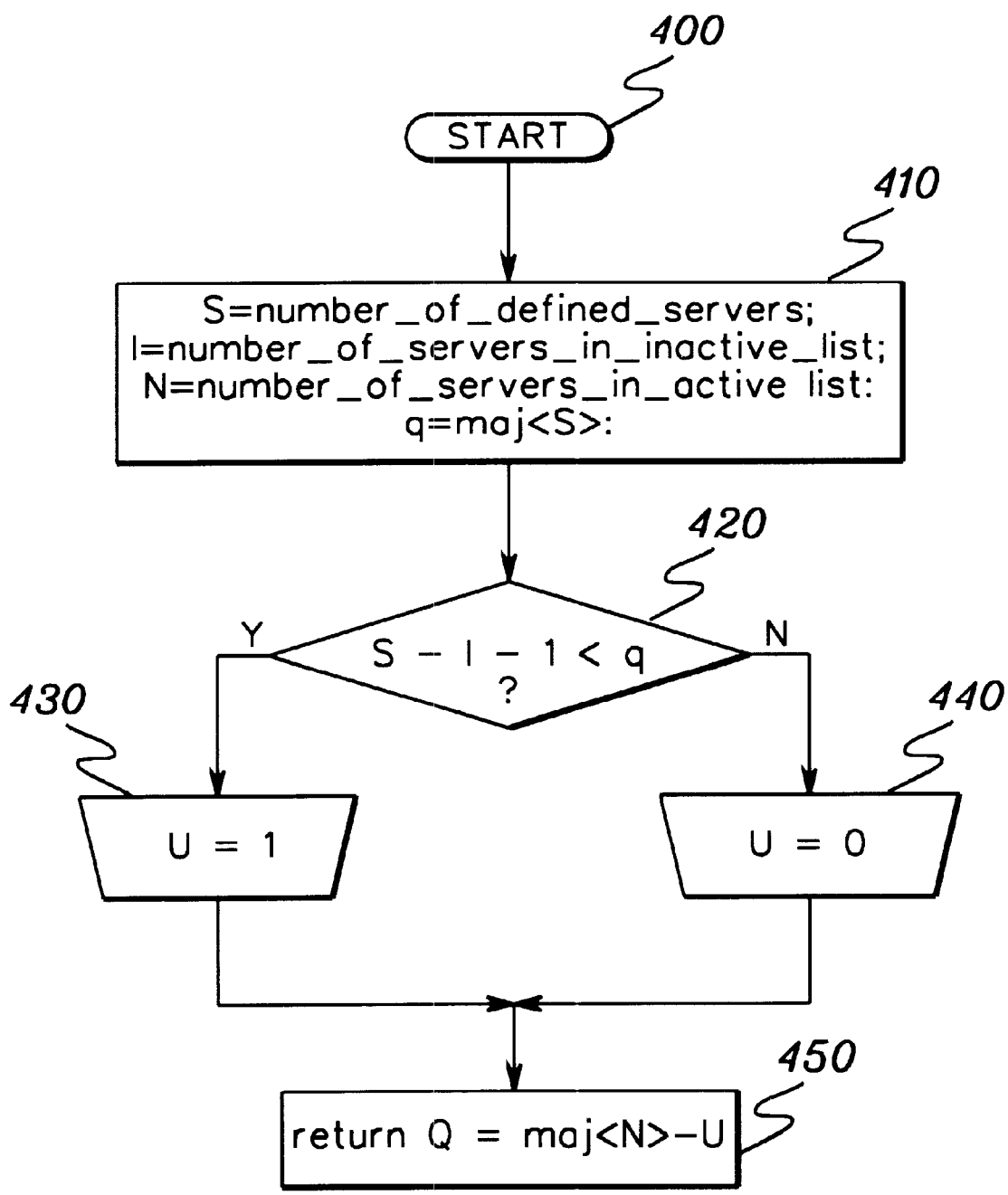
FIG. 8 is a flowchart of one embodiment of a procedure for calculating quorum in accordance with the principles of the present invention.

FIGS. 6–8 present a flowchart embodiment of a dynamic server recovery procedure (DSRP) algorithm implemented in accordance with the principles of the present invention. More particularly, FIG. 6 depicts a dynamic server recovery procedure wherein each server continuously listens for messages from its peers (i.e., other processors within a quorum group of processors). When updating its state, a processor will execute the process_message_procedure of FIGS. 7A & 7B with each message that it receives. The process_message_procedure sets the quorum number and incarnation variables to the appropriate conditions to terminate the search, and also modifies the current processor list which is used in the search for a quorum of servers. At the end of each iteration, the processor will send to its peers in the current search list the latest incarnation number and the current search list itself. FIG. 8 depicts one embodiment of a process for determining a "relaxed" quorum number in accordance with the principles of the present invention.

As shown in FIG. 6, DSRP processing commences with starting or restarting of a processor in a quorum group of processors 100. Variables are initialized, including my_incarnation and current_search_list 110. Inquiry is then made whether quorum has been achieved 120. If "no", then the procedure (which is implemented at each restarted server of the group of servers) determines whether a message has been received from another group member 130. If "no", then the server sends a message to each other server in the group comprising its current server list and incarnation number 140. Processing then returns to inquire whether a quorum was achieved 120.

If a message has been received at the server, then the server executes the process_message_procedure 150 of FIGS. 7A & 7B, which is discussed below. The process_message_procedure routine returns either a TRUE or FALSE value. The DSRP thus determines whether the process_message_procedure returns a value 160. If "no", then the dynamic server recovery procedure continues 170 and loops backs to have the server send its current server list and incarnation number to each peer in its current search list 140. If the process_message_return value is TRUE then processing sends a StopSearch message to all peers in the server's current search list 180, which completes processing 190.

Returning to the start of the dynamic server recovery procedure, if quorum exists 120 (e.g., a stop search message is received from one or more active members of a quorum group of processors) then the recovery procedure is complete 190.

The process_message_procedure of FIGS. 7A & 7B utilizes a message data type, including the following fields:

primary IP address: a contact address of the sender;

backup IP address: a backup contact address, used in the failure of the first one;

incarnation: the latest incarnation number discovered by the sender; and server_list: the latest search list discovered by the sender.

The fields of the message are indicated in the flowcharts using the "." operator; for example, msg.incarnation refers to the incarnation field of a message.

The process_message_procedure will keep a count of the message that a server received with the highest incarnation. It compares this count with a "relaxed" quorum requirement, which is calculated in one embodiment from the calculate_quorum procedure of FIG. 8. When the procedure of FIGS. 7A & 7B determines that the quorum requirement has been achieved, it will set the appropriate values for the DSRP task to terminate. Otherwise, the routine will update its counter and search list and proceed with the search.

With reference to FIGS. 7A & 7B, one embodiment of a process_message_procedure in accordance with the principles of the present invention begins by reading a received message 200, after which processing determines whether the stop_search field of the message is TRUE 210. If so, processing contacts the sender of the message to update, for example, the database with the sender's copy of the database, and update the incarnation number with the sender's incarnation number 220. After this, a TRUE process_message_return value is returned 230 to the dynamic server recovery procedure of FIG. 6.

Assuming that the stop_search field of the message is not true, then the procedure compares the msg.incarnation with my_incarnation 240. This comparison has three possible results. First, if the msg.incarnation equals my_incarnation 250, then processing increments the counter value and calculates a quorum number 260. One embodiment for calculating a "relaxed" quorum number is depicted is FIG. 8 (and described below). After determining the quorum, processing determines whether the counter value is greater than or equal to the quorum value 270. If "yes", then a TRUE value is returned 280 to the dynamic server recovery process. Otherwise, a FALSE value is returned 290 and processing is completed 300.

If the incarnation value in the message header (msg.incarnation) is greater than the server's incarnation value 310, then processing replaces the server's current search list with the search list received with the message, sets the counter to one and updates the server's incarnation value with the incarnation number received with the message 320. Processing then inquires whether the counter value is greater than or equal to the quorum number 270, and proceeds as described above. If the received incarnation number is less than the server's incarnation number 330, then the message sender is added to the server's inactive server list, the message sender is deleted from the active server list, and a value is calculated for the quorum 340 using, for example, the procedure of FIG. 8. After calculating the quorum number, processing returns to determine whether the counter value is greater than the quorum number 270, and proceeds as described above.

As an alternative to using a majority number, the quorum can be calculated as depicted in FIG. 8. This procedure calculates the minimum number of responses necessary to determine if enough responses were received in the present search list to achieve quorum. The set S comprises all registry servers defined in the current search list. The set I comprises the servers which have replied with a lower incarnation number, and are therefore excluded from the search. The set N is defined as S-I, that is the complement of I in respect to S. It is the set that identifiers members for which no response was received or that replied with a current incarnation number. If the condition {S-I>q} is TRUE, then it is possible to subtract one from the quorum requirement, which is given as the majority of the set N. The operator maj< > is calculated by dividing the operand by two, discarding the decimal part and adding 1 to the result.

Referring to FIG. 8, one procedure for calculating a "relaxed" quorum begins 400 by setting variables S, I, N, q 410. (Again, as used herein, variable S represents the number of defined servers in the quorum group, I represents the number of inactive servers in the group, N represents the number of active serves in the group and q is the majority of the number of defined servers.) Thereafter, processing determines whether the number of defined servers less the number of inactive servers minus one is less than a majority of the number of defined servers 420. If so, then the variable "U" is set to 1 430, otherwise, the value is set to 0 440. The quorum number Q returned to the process_message_ procedure equals the majority of the number of active servers less the variable U 450. Those skilled in the art will understand that the quorum calculation summarized above can be used in combination with other quorum based system calculations. Further, the dynamic server recovery procedure presented herein could employ a conventional quorum "majority" number rather then the "relaxed" majority of FIG. 8.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for recovering a current state of a quorum group of processors dynamically reconfigured while at least one processor of said quorum group of processors was unavailable, said method comprising:

obtaining, for said at least one processor, said current state of said dynamically reconfigured quorum group of processors from one or more processors of said quorum group of processors; and wherein each processor of said quorum group of processors includes an incarnation number and a list of member processors which resulted from a commit process; wherein said commit process resulted in said incarnation number and required participation by a majority of processors of said quorum group of processors; and wherein said obtaining comprises checking said one or more processors of said quorum group of processors for incarnation numbers and lists of member processors which resulted from the commit processes.

2. The method of claim 1, wherein said checking comprises updating said at least one processor's incarnation number and list of member processors with a current incarnation number and a current list of member processors received from said one or more processors of said quorum group of processors.

3. The method of claim 1, wherein said obtaining comprises exchanging states of processors in said quorum group of processors in order that a current incarnation number and a current list of member processors of said quorum group of processors is propagated to said at least one processor.

4. The method of claim 1, wherein said checking comprises sending from said at least one processor a message to said one or more processors of said quorum group of processors requesting their incarnation numbers and lists of member processors.

5. The method of claim 1, wherein said obtaining comprises determining said current state using a current quorum number of processors obtained using a current list of member processors received from said one or more processors of said quorum group of processors.

6. The method of claims 5, wherein said lists of member processors maintained by said one or more processors comprises for each processor of said one or more processors a list of inactive processors of the group and a list of active processors of the group, and wherein said quorum comprises for a particular processor, less than a majority of defined processors in said quorum group of processors if the number of defined processors less the number of processors in its inactive list minus one is less than a majority of the number of processors in its active list.

7. A system for recovering a current state of a quorum group of processors dynamically reconfigured while at least one processor of said quorum group of processors was unavailable, said system comprising:

means for obtaining, for said at least one processor, said current state of said dynamically reconfigured quorum group of processors from one or more processors of said quorum group of processors; and wherein each processor of said quorum group of processors includes an incarnation number and a list of member processors which resulted from a commit process; wherein said commit process resulted in said incarnation number and required participation by a majority of processors of said quorum group of processors; and wherein said means for obtaining comprises means for checking said one or more processors of said quorum group of processors for incarnation numbers and lists of member processors which resulted from the commit processes.

8. The system of claim 7, wherein said means for checking comprises means for updating said at least one processor's incarnation number and list of member processors with a current incarnation number and a current list of member processors received from said one or more processors of said quorum group of processors.

9. The system of claim 7, wherein said means for obtaining comprises means for exchanging states of processors in said quorum group of processors in order that a current incarnation number and a current list of member processors of said quorum group of processors is propagated to said at least one processor.

10. The system of claim 7, wherein said means for checking comprises means for sending from said at least one processor a message to said one or more processors of said quorum group of processors requesting their incarnation numbers and lists of member processors.

11. The system of claim 7, wherein said means for obtaining comprises means for determining said current state using a current quorum number of processors obtained employing a current list of member processors received from said one or more processors of said quorum group of processors.

12. The system of claim 11, wherein said lists of member processors maintained by said one or more processors comprises for each processor of said one or more processors a list of inactive processors of the group and a list of active processors of the group, and wherein said quorum comprises for a particular processor, less than a majority of defined processors in said quorum group of processors if the number of defined processors less the number of processors in its inactive list minus one is less than a majority of the number of processors in its active list.

13. A distributed processing system comprising:
a group of processors, said group of processors being adapted to allow recovering of a current state for at least one processor thereof which was unavailable during a dynamic reconfiguration of said group of processors, said group of processors being adapted to:
obtain, for said at least one processor, said current state of said dynamically reconfigured quorum group of processors from one or more processors of said quorum group of processors; and
wherein each processor of the quorum group of processors includes an incarnation number and a list of member processors which resulted from a commit process; wherein said commit process resulted in said incarnation number and required participation by a majority of processors of said quorum group of processors; and wherein the group of processors is adapted to allow the at least one processor to check the one or more processors for incarnation numbers and lists of member processors which resulted from the commit processes.

14. At least one program storage device readable by a machine, tangibly embodying at least one program of instructions executable by the machine to perform a method for recovering a current state of a quorum group of processors dynamically reconfigured while at least one processor of said quorum group of processors was unavailable, comprising:
obtaining, for said at least one processor, said current state of said dynamically reconfigured quorum group of processors from one or more processors of said quorum group of processors; and
wherein each processor of said quorum group of processors includes an incarnation number and a list of member processors which resulted from a commit process; wherein said commit process resulted in said incarnation number and required participation by a majority of processors of said quorum group of processors; and wherein said obtaining comprises checking said one or more processors of said quorum group of processors for incarnation numbers and lists of member processors which resulted from the commit processes.

15. The method of claim 2, wherein said current incarnation number and said current list of member processors are received from a majority of processors of said quorum group of processors.

16. The system of claim 8, wherein said current incarnation number and said current list of member processors are received from a majority of processors of said quorum group of processors.

* * * * *